US009590661B2

(12) United States Patent
Emmanuel et al.

(10) Patent No.: US 9,590,661 B2
(45) Date of Patent: Mar. 7, 2017

(54) SYSTEMS AND METHODS FOR IMPROVING WLAN RANGE

(71) Applicant: NETGEAR, Inc., San Jose, CA (US)

(72) Inventors: Joseph Amalan Arul Emmanuel, Cupertino, CA (US); Peiman Amini, Mountain View, CA (US); Paul Nysen, San Jose, CA (US); Shun-Liang Yu, Milpitas, CA (US); Chia-Wei Liu, Fremont, CA (US); Shahrokh Zardoshti, Pleasanton, CA (US); Gin Wang, San Jose, CA (US); Henry Chen, Sunnyvale, CA (US)

(73) Assignee: Netgear, Inc., San Jose, CA (US)

(*) Notice: Subject to any disclaimer, the term of this patent is extended or adjusted under 35 U.S.C. 154(b) by 97 days.

(21) Appl. No.: 14/242,662

(22) Filed: Apr. 1, 2014

(65) Prior Publication Data
US 2015/0139204 A1    May 21, 2015

Related U.S. Application Data

(60) Provisional application No. 61/905,813, filed on Nov. 18, 2013.

(51) Int. Cl.
*H04B 1/00* (2006.01)
*H04L 27/26* (2006.01)
*H04B 1/04* (2006.01)

(52) U.S. Cl.
CPC .......... *H04B 1/005* (2013.01); *H04B 1/0096* (2013.01); *H04B 2001/0491* (2013.01); *H04L 27/2672* (2013.01)

(58) Field of Classification Search
CPC .................. H04B 1/005; H04B 1/0096; H04B 2001/0491; H04L 27/2672
See application file for complete search history.

(56) References Cited

U.S. PATENT DOCUMENTS

| | | | | |
|---|---|---|---|---|
| 2003/0027577 A1* | 2/2003 | Brown | .................. | H04W 72/00 455/445 |
| 2005/0240781 A1* | 10/2005 | Gassoway | ............. | G06F 21/552 713/188 |
| 2010/0261437 A1* | 10/2010 | Behzad | .................. | H04B 1/005 455/77 |
| 2011/0176476 A1* | 7/2011 | Tsuruoka | ............... | H04B 7/155 370/315 |
| 2012/0236906 A1* | 9/2012 | Binder | ............... | H04B 7/15542 375/133 |
| 2013/0070876 A1* | 3/2013 | Wu | ........................ | H04H 40/90 375/340 |

* cited by examiner

*Primary Examiner* — Warner Wong
(74) *Attorney, Agent, or Firm* — Perkins Coie LLP

(57) ABSTRACT

Various embodiments disclose systems and methods for employing a Sub1G signal (e.g. a signal in the range of approximately 500 Mhz or 800 mHz) for use with internal and/or external components of various user devices. The Sub1G region may provide a path loss advantage over traditional 2.4 and 5 Ghz systems because of the lower frequency in free-space path loss model. Sub 1G may also present less interference compared to 2.4 GHz (e.g., better QoS for applications such as VOIP, Gaming, etc.). In some of the disclosed embodiments, Sub1G may be employed using current 2.4G or 5G Wireless LAN chipset with RF Up/Down Converters. In some embodiments, the Sub1G approach may be used to create a Long Range Bridge, Long Range Extender, Long Range Client, Long Range Hotspot, etc.

16 Claims, 14 Drawing Sheets

| | 105 | 110 | 115 |
|---|---|---|---|
| Frequency (MHz) | 863-868 / 902-928 | 2400-2483.5 | 5150 to 5825 |
| Path Loss @ 3m (dB) | +8.4 | 50.0 | 56.6 to 57.7 |
| Interference | Medium | Highest | Lower |
| Bandwidth (MHz) | 5-26 | 83.5 | 480 |
| Phy Rate (2x2 MIMO) (Mbps) 11n | 150 (HT20) | 150 (HT20) 300 (HT40) | 300 (HT40) |
| Range | Best (2.0x) | Better (1.0x) | Good (Band -I to IV) (0.25x to 0.50x) |
| Transmit Power (dBm) / EIRP (dBm) | 20 to 30 | 20 to 30 | 17 to 30 |
| Antenna Gain (dBi) to NA | 6 | 6 | 6 |
| Regional Availability | Worldwide (with Regional BW limitations) | Worldwide | Worldwide (with BW regional limitations) |

| Region | Frequency Allocation |
|---|---|
| North America | 902-928MHz |
| European Union | 836-868 MHz |
| Australia | 918-926 MHz |
| China | 755-787 MHz |
| Japan | 916.5-927.5 MHz |
| Korea | 917.5-923.5 MHz |
| Singapore | 866-869 MHz<br>920-925 MHz |

| Frequency Range | 902-928 (26) | | 863-868 (5) | | 916.5-927.5 (11) | | 917.5-923.5 (6) | |
|---|---|---|---|---|---|---|---|---|
| Region | US (903.5-925.5MHz, f_center = 915.5MHz, BW = 2MHz) | | EU (863-868MHz, f_center = 865.5MHz, BW = 5MHz) | | Japan (918-923MHz, f_center = 920.5MHz, BW = 5MHz) | | Korea (918-923MHz, f_center = 920.5MHz, BW = 5MHz) | |
| Channel(MHz) | LO(MHz) | | LO(MHz) | | LO(MHz) | | LO(MHz) | |
| 1(2412) | 1496.5 | | 1546.5 | | 1491.5 | | 1491.5 | |
| 2(2417) | 1501.5 | | 1551.5 | | 1496.5 | | 1496.5 | |
| 3(2422) | 1506.5 | | 1556.5 | | 1501.5 | | 1501.5 | |
| 4(2427) | 1511.5 | | 1561.5 | | 1506.5 | | 1506.5 | |
| 5(2432) | 1516.5 | | 1566.5 | | 1511.5 | | 1511.5 | |
| 6(2437) | 1521.5 | | 1571.5 | | 1516.5 | | 1516.5 | |
| 7(2442) | 1526.5 | | 1576.5 | | 1521.5 | | 1521.5 | |
| 8(2447) | 1531.5 | | 1581.5 | | 1526.5 | | 1526.5 | |
| 9(2452) | 1536.5 | | 1586.5 | | 1531.5 | | 1531.5 | |
| 10(2457) | 1541.5 | | 1591.5 | | 1536.5 | | 1536.5 | |
| 11(2462) | 1546.5 | | 1596.5 | | 1541.5 | | 1541.5 | |
| 12(2467) | 1551.5 | | 1601.5 | | 1546.5 | | 1546.5 | |
| 13(2472) | 1556.5 | | 1606.5 | | 1551.5 | | 1551.5 | |

*FIG. 3*

SYSTEMS AND METHODS FOR IMPROVING WLAN RANGE

CROSS-REFERENCE TO RELATED APPLICATIONS

This application is entitled to the benefit of and claims priority to U.S. Provisional Patent Application No. 61/905,813, entitled "WLAN Range and QoS Using sub1G" filed Nov. 18, 2013, the contents of which are incorporated herein by reference in their entirety for all purposes.

FIELD

Various of the disclosed embodiments relate to systems and methods for improving the range of a Wireless Local Area Network (WLAN), particularly using the Sub1G range.

BACKGROUND

WLAN systems are very popular in home, office, and business environments. Not only do conventional laptops and desktop systems rely on WLAN services to connect with remote resources but mobile phones, personal digital assistants, televisions, and home entertainment systems increasingly take advantage of the network as well. These demands impose requirements not only for additional bandwidth but also additional range.

Unfortunately, technical limitations upon the 2.4 and 5 GHz ranges typically employed by WLAN systems limit the ability of these systems to address many users' growing needs. Accordingly, there exists a need for systems and methods to extend the range of these systems while still offering quality communication links that don't require considerable adjustments to be compatible with existing user devices.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIG. 1 is a table comparing various frequency-related features as may occur in some embodiments.

FIG. 2 is a table depicting regional availability for the industrial, scientific, and medical (ISM) as may occur in some embodiments.

FIG. 3 is a table plotting the frequency range for difference channels in various regions.

Figure 4:
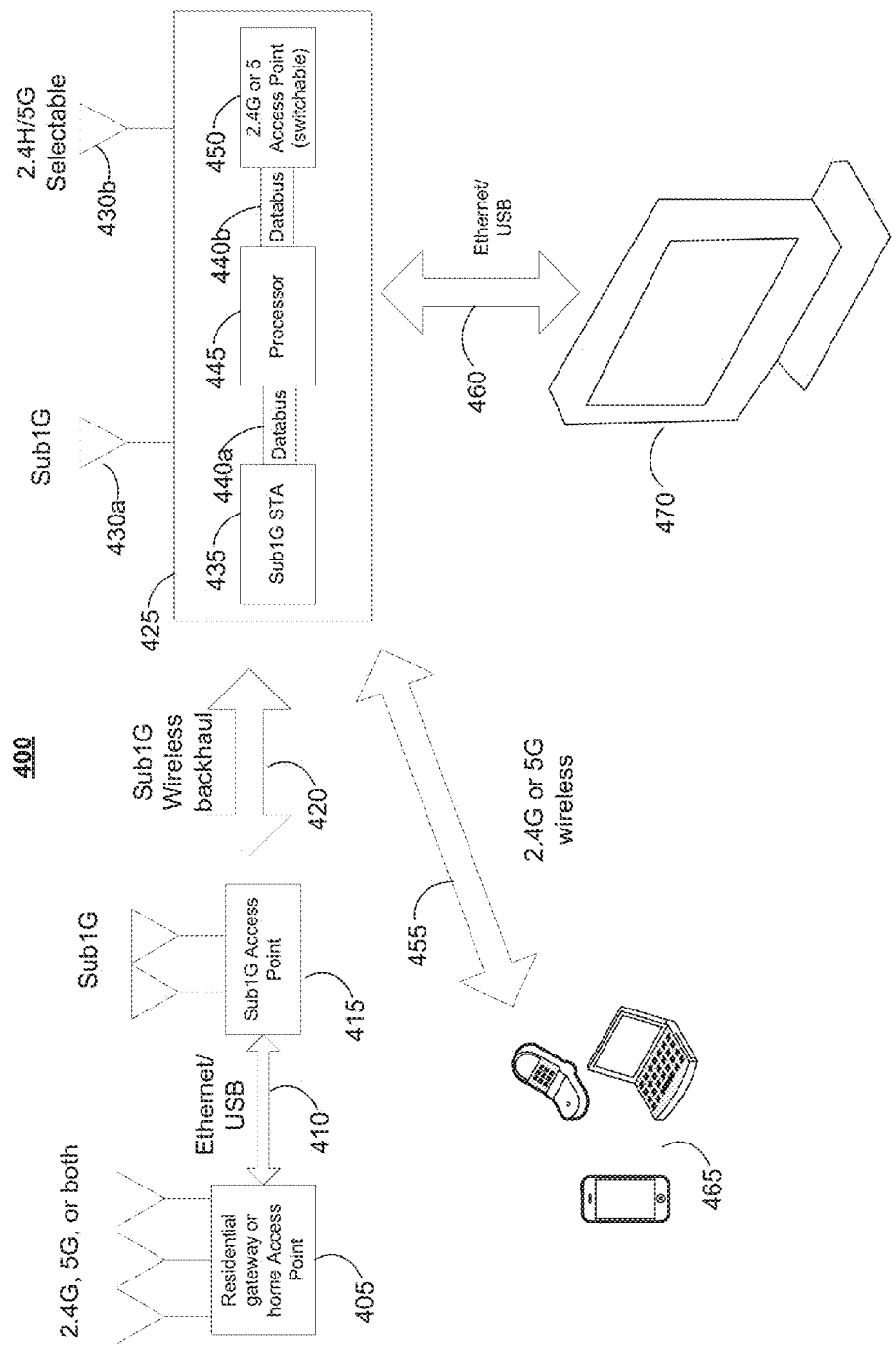
FIG. 4 is a block diagram of an example long-range bridge/extender as may occur in some embodiments.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Overview

Various of the disclosed embodiments relate to systems and methods for employing a Sub1G signal (e.g. a signal in the range of approximately 500 Mhz or 800 mHz) for use with internal and/or external components of various user devices. Sub1G may provide a path loss advantage over traditional 2.4 and 5 Ghz systems because of the lower frequency in free-space path loss model: e.g., 8 dB (×2 range) with respect to 2.4 GHz and 14-16 dB (×4 range) with respect to 5 GHz. Sub 1G may also present less interference compared to 2.4 GHz (e.g., a better QoS for application such as VOIP, Gaming, etc.). In some of the disclosed embodiments, Sub1G may be employed using a current 2.4G or 5G Wireless LAN chipset with RF Up/Down Converters. In some embodiments, the Sub1G approach may be used to create a Long Range Bridge, Long Range Extender, Long Range Client, Long Range Hotspot, etc.

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Regional Factors and Comparison

FIG. 1 is a table 100 comparing various frequency-related features as may occur in some embodiments. In columns 110 and 115 the characteristics of traditional 2.4 and 5 Ghz bands, respectively, are depicted. Column 105 depicts various features of Sub1G signals, e.g., 863-868 or 902-928 MHz. As depicted, the path loss is considerably less for the Sub1G signal than for the 2.4 and 5 GHz, while providing a greater range. The transmit power of the Sub1G signal can be similar to the 2.4 GHz signal. Accordingly, various embodiments contemplate repurposing existing chipsets or producing new chipsets to take advantage of the improved features indicated in column 105. As discussed herein, one will recognize that reference to 2.4 and 5 GHz refers to the commonly used frequencies near those regions, rather than necessarily the literal, exact frequency 2.4 or 5.0.

FIG. 2 is a table 200 depicting regional availability for the ISM band as may occur in some embodiments. This band is generally available in many local environments and at least a portion of the band may be used as the Sub1G signal. However, as depicted in table 200, there is some variation between the regions. Rather than generate hardware, firmware, and/or software specific implementations for each region it may be preferable to design systems which may be compatible with multiple markets, or which may be easily reconfigured for use in a different market. Several embodiments encompassing this feature are discussed in greater detail below (e.g., a mixer or oscillator may be calibrated differently for each region). FIG. 3 is a table plotting the frequency range for difference channels in various regions.

Long-Range Bridge Extenders

FIG. 4 is a block diagram of an example long-range bridge/extender system 400 using a Sub1G backhaul signal 420 as may occur in some embodiments. In this example, a residential gateway or home access point 405, as may be commonly used today, may be present, e.g., in a home, office, or business location to provide local users access to a network resource, e.g., the Internet. A connection, e.g., an Ethernet or USB connection 410 may connect the gateway 405 with a Sub1G access point 415. The Sub1G access point 415 may be designed using existing 2.4 Ghz and 5 Ghz chipsets, but with the parameters adjusted to operate on the Sub1G band (e.g., the ISM band).

The Sub1G access point 415 may be used to provide a Sub1G backhaul 420 with a Sub1G receiving station 425. The Sub1G receiving station 425 may be integrated with a 2.4 GHz, 5 GHz, or switchable 2.4-5 GHz access point 450. Accordingly, the Sub1G receiving station 425 may include one or more antennae 430a-b that communicate in the Sub1G, 2.4 GHz, and 5 GHz bands. Data-busses 440a-b may place a Sub1G receiving station component 435 in electrical communication with the access point 450. A processor 445 may provide control and reformatting operations to facilitate exchanges between the Sub1G component 435 and the access point 450.

The Sub1G receiving station 425 may communicate with conventional user devices 465 via a 2.4G or 5G wireless channel 455. In this manner, the users of devices 465 may receive the benefit of communication with the residential gateway 405, but without being aware (or requiring that their devices 465 be aware) of the intervening Sub1G backhaul 420. Because the intervening Sub1G backhaul 420 may increase the range beyond a typical 2.4 Ghz or 5 GHz access point, the users are able to communicate over longer distances than may be possible in the absence of the backhaul.

In some embodiments, the Sub1G receiving station 425 may provide local connections in addition to the 2.4 and 5 Ghz channels. For example, the Sub1G receiving station 425 may stream media over an Ethernet or USB connection 460 to a display 470, such as a digital television (e.g., to view videos streamed from the Internet). These direct connections may likewise be unaware of the intervening Sub1G backhaul connection 420.

Long-Range Client

Figure 5:
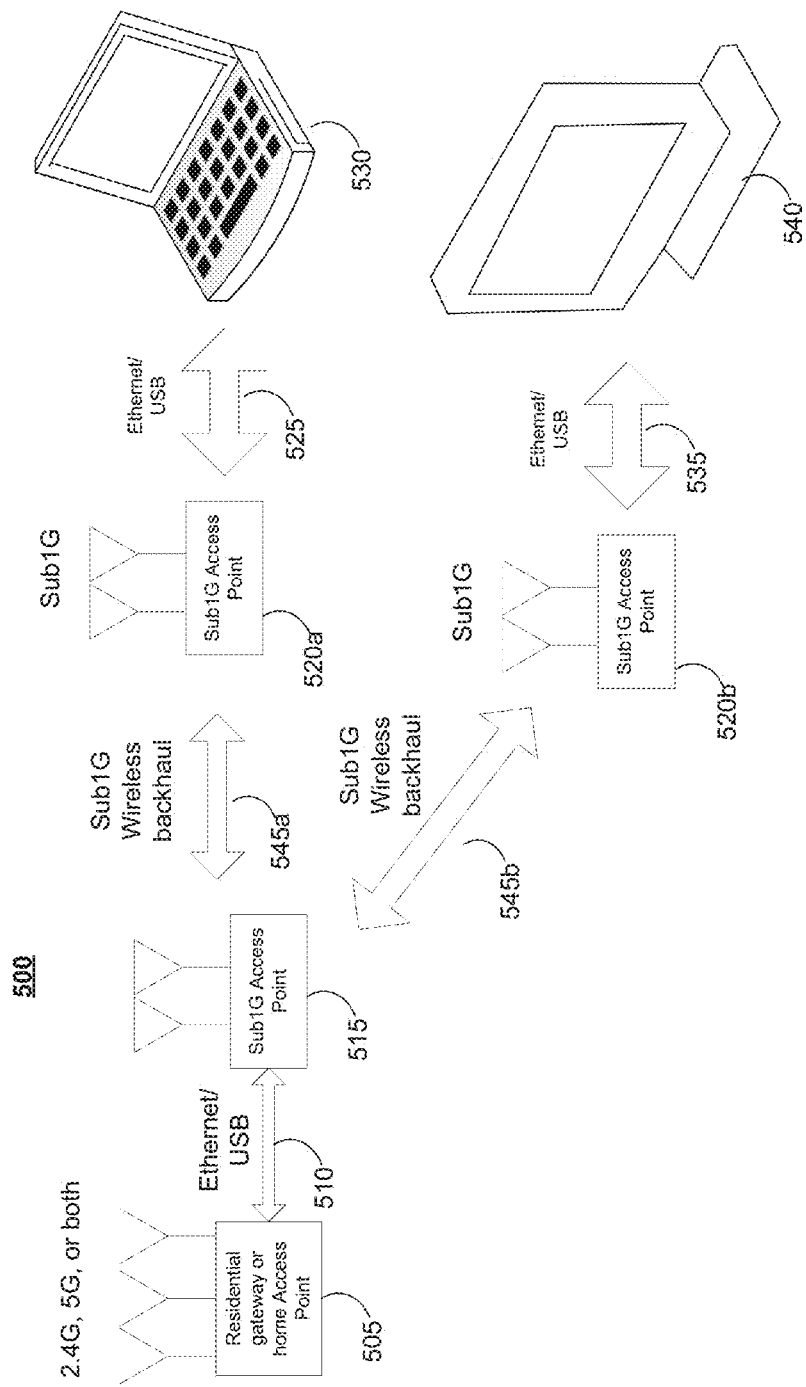
FIG. 5 is a block diagram of a long-range client as may occur in some embodiments.

FIG. 5 is a block diagram of an example long-range client system 500 as may occur in some embodiments. A residential gateway or access point system 505 may be in communication with a Sub1G access point system 515 via an Ethernet/USB connection system 510. The Sub1G access point system 515 may communicate with additional Sub1G stations/access points 520a-b via Sub1G wireless backhauls 545a-b. The Sub1G stations/access points 520a-b may communicate with user devices 530, 540, via respective Ethernet/USB connections 525 and 535. For example, in some embodiments the Sub1G stations/access points 520a-b may take the form of USB, FireWire, Bluetooth, or other local connection peripherals. Unlike the example of FIG. 4 wherein the signals were repeated from the Sub1G stations at a 2.4 or 5 GHz band, in this example the information may be provided directly to the user device following receipt at the station via the Sub1G Wireless backhaul 545a-b.

Long-Range Client

Figure 6:
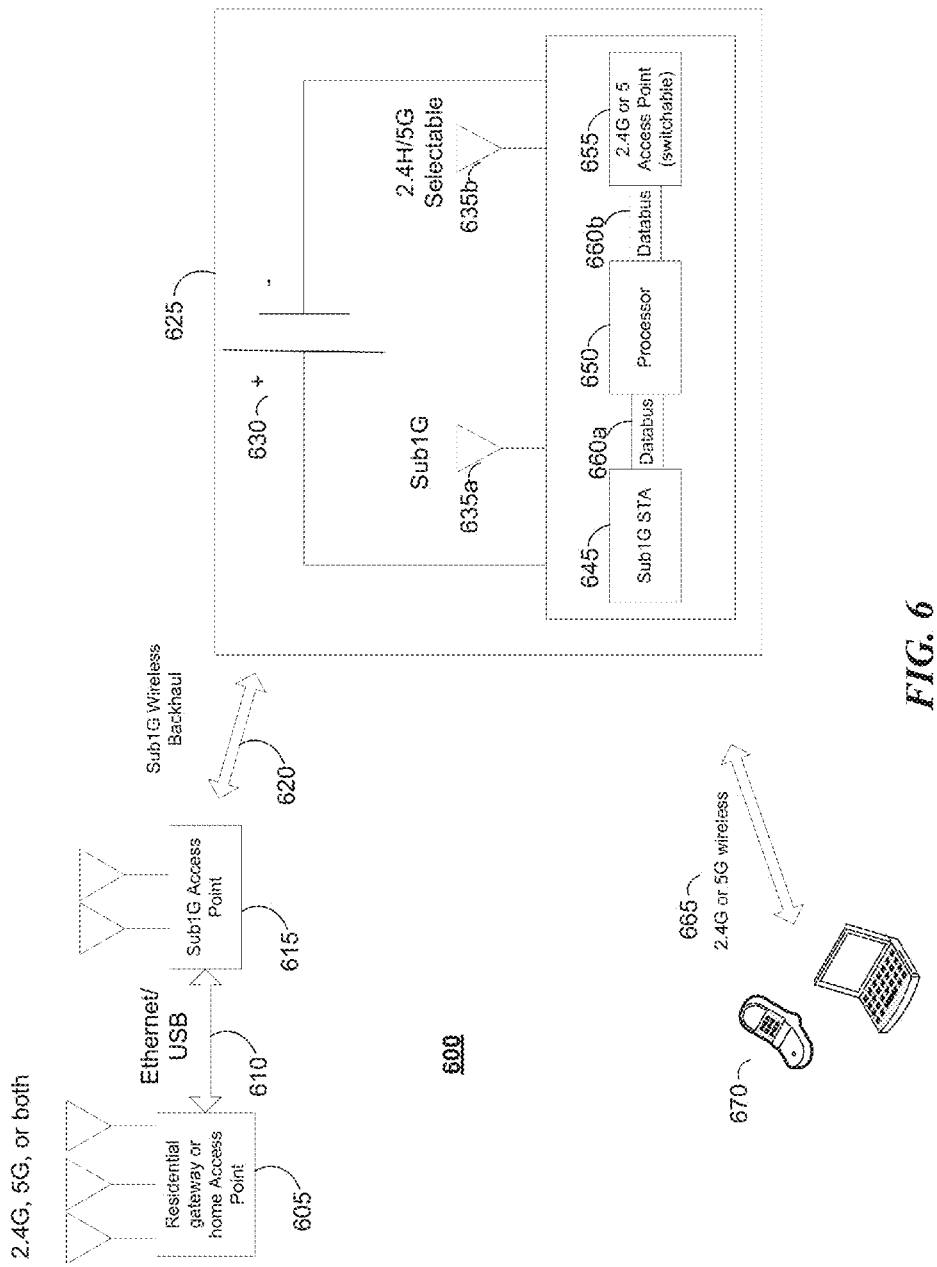
FIG. 6 is a block diagram of an example long-range battery operated hotspot as may occur in some embodiments.

FIG. 6 is a block diagram of an example long-range battery operated hotspot system 600 as may occur in some embodiments. Information from a residential gateway/access point 605 in communication with Sub1G Access Point 615 via Ethernet/USB connection 610 is transmitted across a Sub1G backhaul 620 to a mobile Sub1G receiving station 625 which includes a battery 630 enabling the station 625 to operate remotely. Remote operation may enable the station 625 to take better advantage of the increased range offered by the Sub1G Wireless backhaul 620.

Like the Sub1G receiving station 425, the station 625 may contain both Sub1G 635a and 2.4/5 GHz 635b antenna. The 2.4/5 GHz 635b antenna may communicate data across a 2.4/5 GHz connection 665 to user devices 670. A Sub1G station component 645 may be in communication with 2.4/5 GHz component 655 via data-busses 660a-b. Data-busses 660a-b may also couple the components with a processor 650.

Sub 1G Functionality

Figure 7:
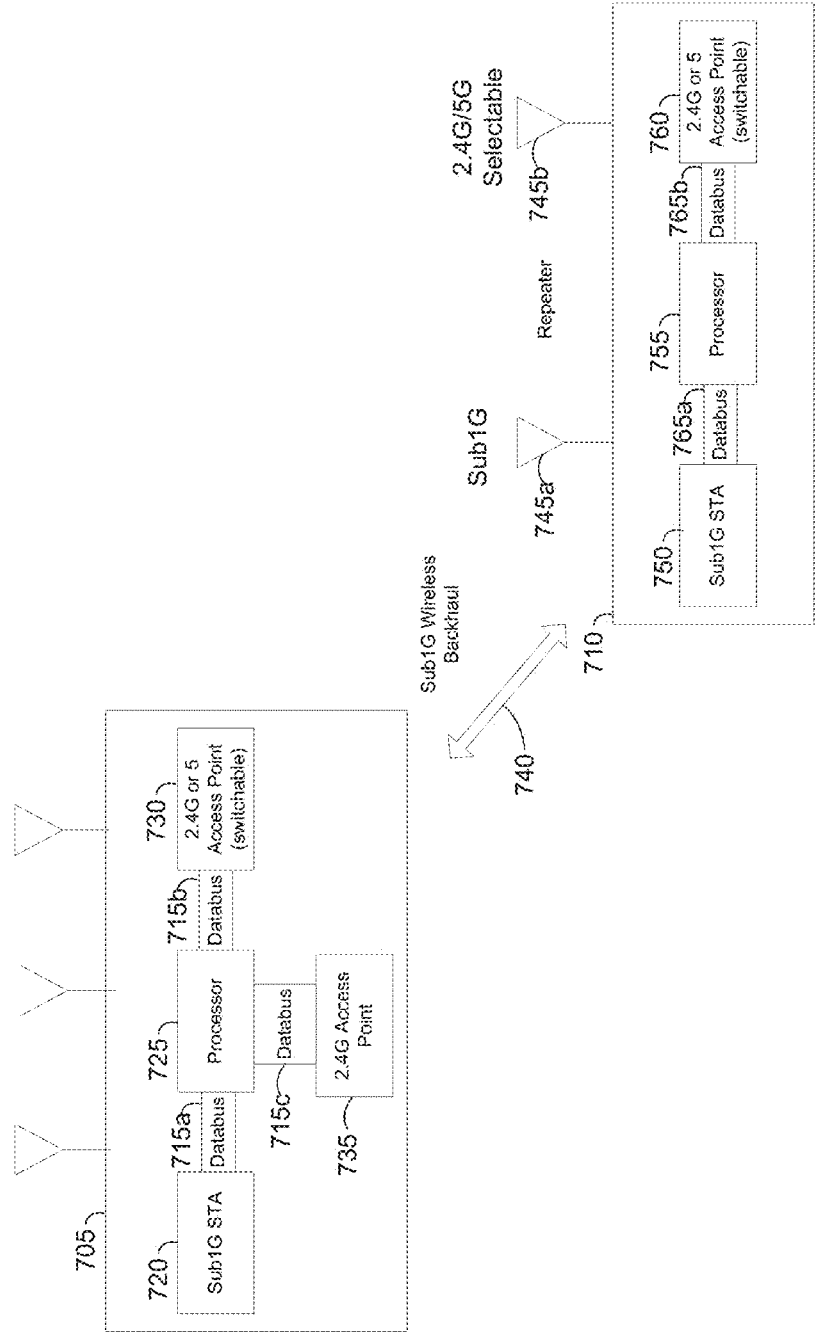
FIG. 7 is a block diagram of a next generation router/repeater with Sub1G functionality as may occur in some embodiments.

FIG. 7 is a block diagram of a next generation router/repeater 710 with Sub1G functionality as may occur in some embodiments. An access point 705 may possess both 2.4/5 GHz and Sub1G capabilities. For example, the access point 705 may include a 2.4 GHz access point component 735, a 2.4/5 GHz access point component 730, and a Sub1G component 720, whose operations are coordinated by one or more processors 725 across a plurality of data-busses 715a-c. Using the Sub1G component 720 the access point 705 may communicate across a Sub1G backhaul 740 to a router/repeater system 710.

The router/repeater system 710 may include a Sub1G component 750, a 2.4/5 GHz component 760, corresponding antenna 745a-b. A processor 755 may coordinate communication between the Sub1G component 750 and 2.4/5 GHz component 760 across databusses 765a-b.

Example 2.4/5G WLAN Sub1G Systems

Figure 8:
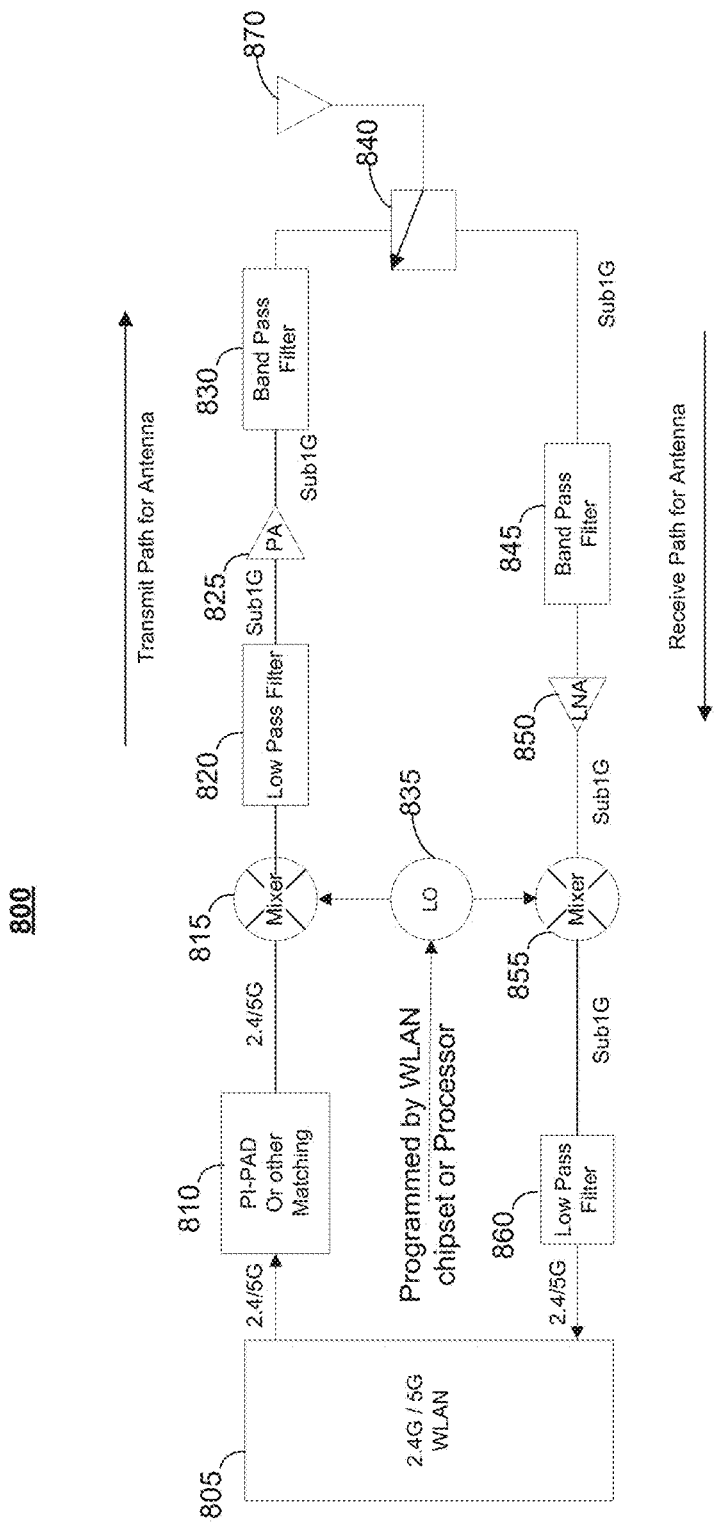
FIG. 8 is a block-level circuit diagram of a first example 2.4G WLAN Sub1G system as may occur in some embodiments, e.g., in Sub1G access point.

FIG. 8 is a block-level circuit diagram of a first example 2.4G WLAN Sub1G system 800 as may occur in some embodiments, e.g., in Sub1G access point 415. The system 800 may be in communication with a 2.4/5 GHz WLAN component 805. When transmitting data, data may pass from the 2.4/5 GHz WLAN component 805 to the antenna 870 along the transmit path. 2.4/5 GHz data may pass from the WLAN component 805 to a π-PAD or other suitable attenuator circuit or impedance matching system 810. Following impedance matching the data may travel to a frequency mixer 815. The mixer 815 may relocate the data from a 2.4/5 GHz bandwidth to a Sub1G bandwidth. The mixer 815 may be configured by a local oscillator 835. The frequency of the local oscillator (LO) used for the mixers may change for different regions as discussed in greater detail herein. Accordingly, software, firmware, or hardware may control the LO frequency using GPIO lines of WLAN chipsets, processor, system-on-a-chip (SoC), or other hardware control lines.

The frequency adjusted data may then travel from the mixer 815 to a low pass filter 820 to remove any extraneous frequencies from the frequency adjusted-data. Though referred to as a "low pass" filter, one will recognize that an appropriately configured bandpass or other filtering system may achieve the same or similar effect. The filtered data may then pass through a power amplifier 825 before entering a band pass filter 830. The data may then be transmitted across the Sub1G backhaul using transmitter switch 840.

When receiving data, data may pass from the antenna 870 to the 2.4/5 GHz WLAN component 805 along the receive path. Various embodiments contemplate using 2.4G or 5G WLAN hardware for Sub1G. With regard to a 2.4G WLAN chipset, the output signal of an 802.11n/b/g chipset or SoC may be used as a base to generate the signal for a Sub1G transmitter. The signal may pass through a band pass filter 845 to remove noise and pass through a low-noise amplifier 850 to amplify the signal. The mixer 855 and filter 860 may be used to shift the signal in frequency domain from 2.4G band to Sub1G band. In some embodiments, the receive input signal of an 802.11n/b/g chipset or SoC may be used to receive a Sub1G WLAN signal.

With regard to a 5G WLAN chipset, a similar process may occur, possibly reusing the same or similar components. The output signal of an 802.11a/n chipset or SoC may be used as a base signal to generate the signal for a Sub1G transmitter. A mixer and filter may be used to shift the signal in frequency domain from 5G band to the Sub1G band. The receive input signal of an 802.11a/n chipset or SoC may be used to receive a Sub1G WLAN signal. A mixer and filter may be used to shift the signal in the frequency domain from a Sub1G band to 5G.

Figure 9:
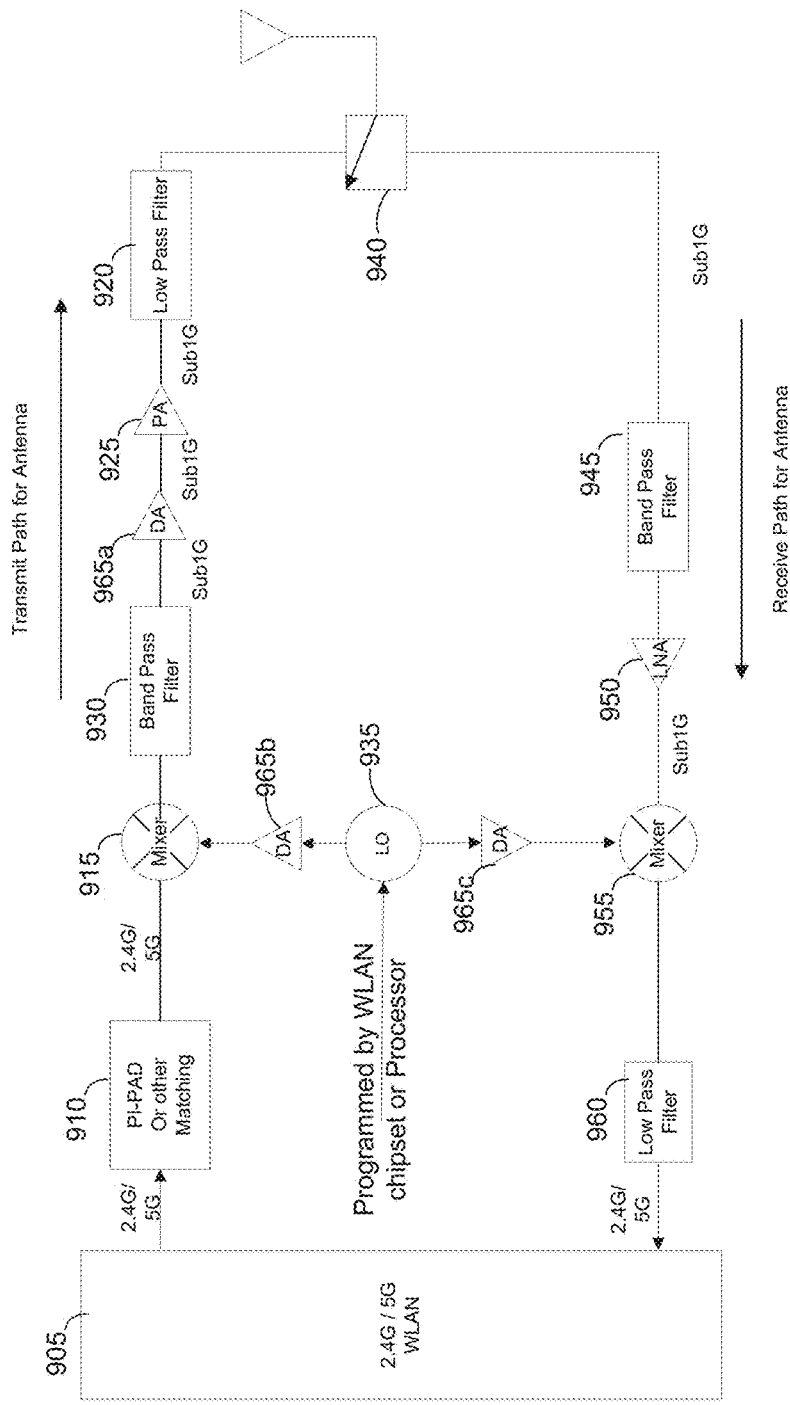
FIG. 9 is a block-level circuit diagram of a second example 2.4G WLAN Sub1G system as may occur in some embodiments

FIG. 9 is a block-level circuit diagram of a second example 2.4G WLAN Sub1G system as may occur in some embodiments. Components 905-960 may be the same as described above for corresponding components 805-860. However, the bandpass filter 930 has exchanged positions with low pass filter 920. Drivers 965*a-c* may be used to ensure that the desired signals are not overpowered by their receiving connections.

Figure 10:
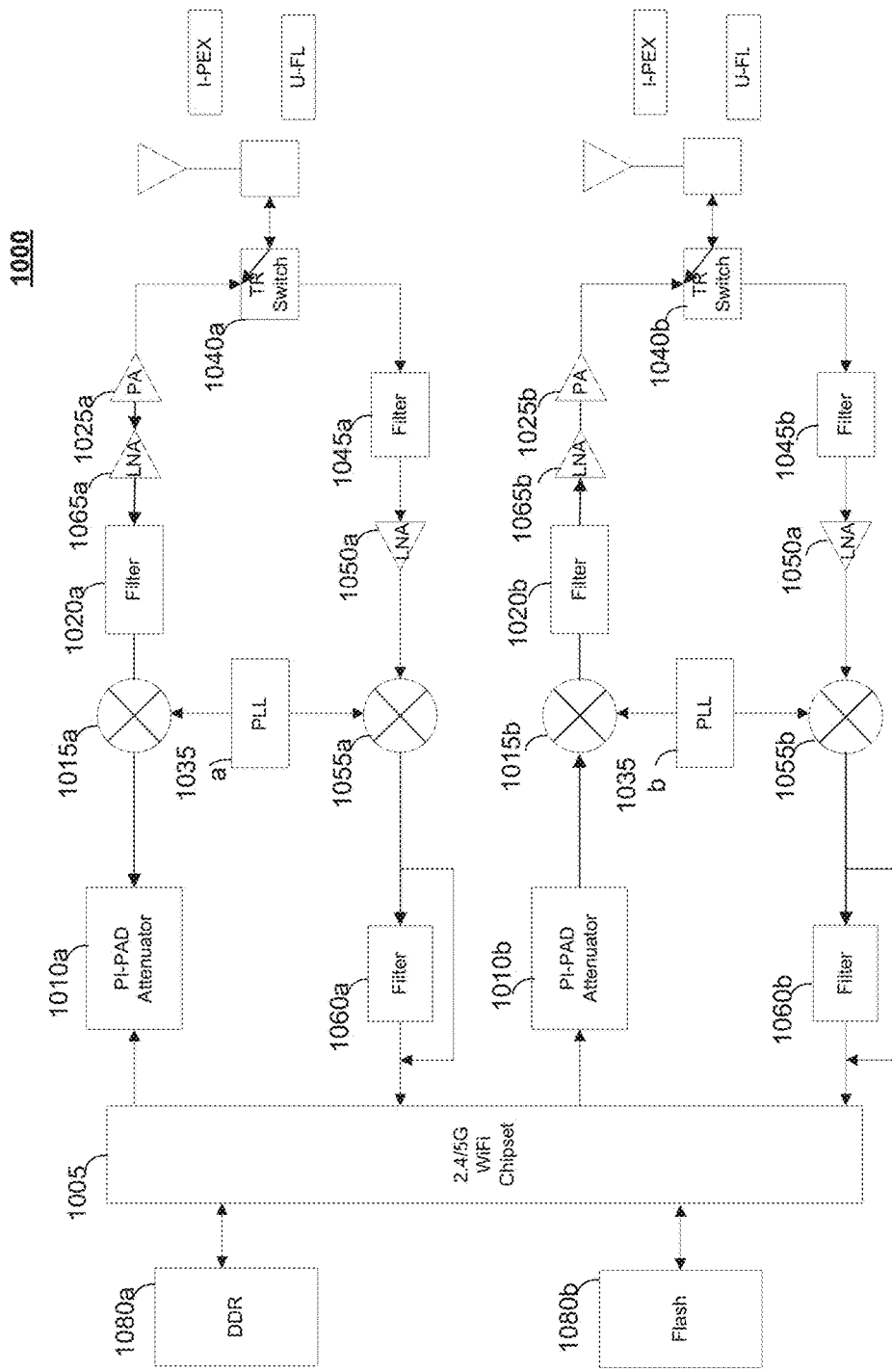
FIG. 10 is a block-level circuit diagram of a second example 2.4 G WLAN Sub1G system as may occur in some embodiments

FIG. 10 is a block-level circuit diagram of a second example 2.4G WLAN Sub1G system 1000 as may occur in some embodiments. Components 1005, 1010*a*-1060*a* and 1010*b*-1060*b* may be the same as described above for corresponding components 805-860. A the local oscillator may take the form of a phase-locked loop 1035*a,b* in some embodiments. By having multiple circuits, multiple Sub1G backhauls may be possible. The antenna may be an I-PEX or U-FL as depicted. Other suitable RF connectors will readily be recognized. DDR and Flash memories 1080*a-b* may respectively store information to be transmitted across a connection, for example, when queuing data to be routed across a Sub1G backhaul (possibly after receiving the data from a 2.4 or 5 GHz channel—conversely data may be received on the backhaul and transmitted across the 2.4 or 5 GHz channel).

Although depicted above as circuit components, one will recognize that the functions of the various components depicted in FIGS. 8-10 may readily be replicated in software or firmware in some embodiments.

Mask Application

Figure 11:
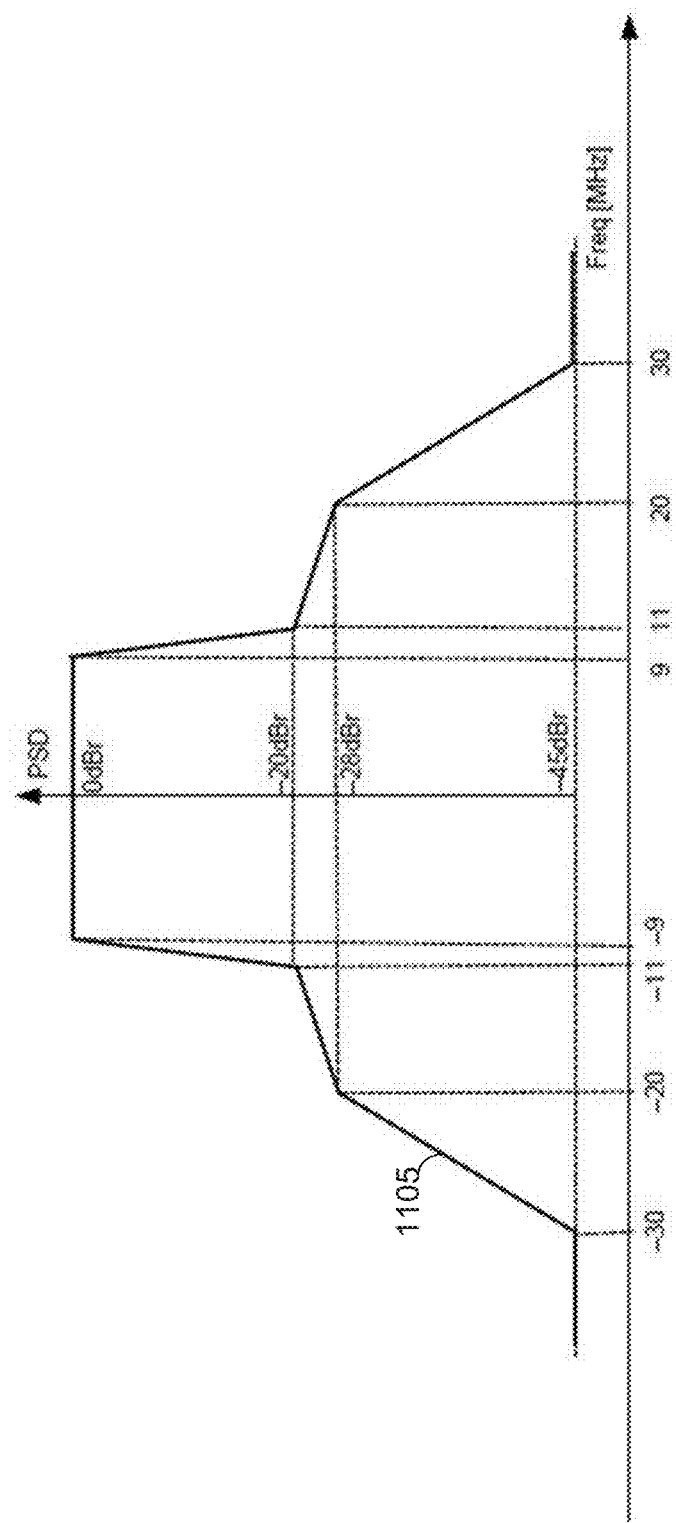
FIG. 11 is plot of a nominal mask as may be applied in some embodiments.

FIG. 11 is plot of a nominal mask as may be applied in some embodiments. The mask may be applied using filters to ensure Sub1G reception and transmission. The mask may be applied digitally in some embodiments, or via hardware filters.

Interference Effects

Figure 12:
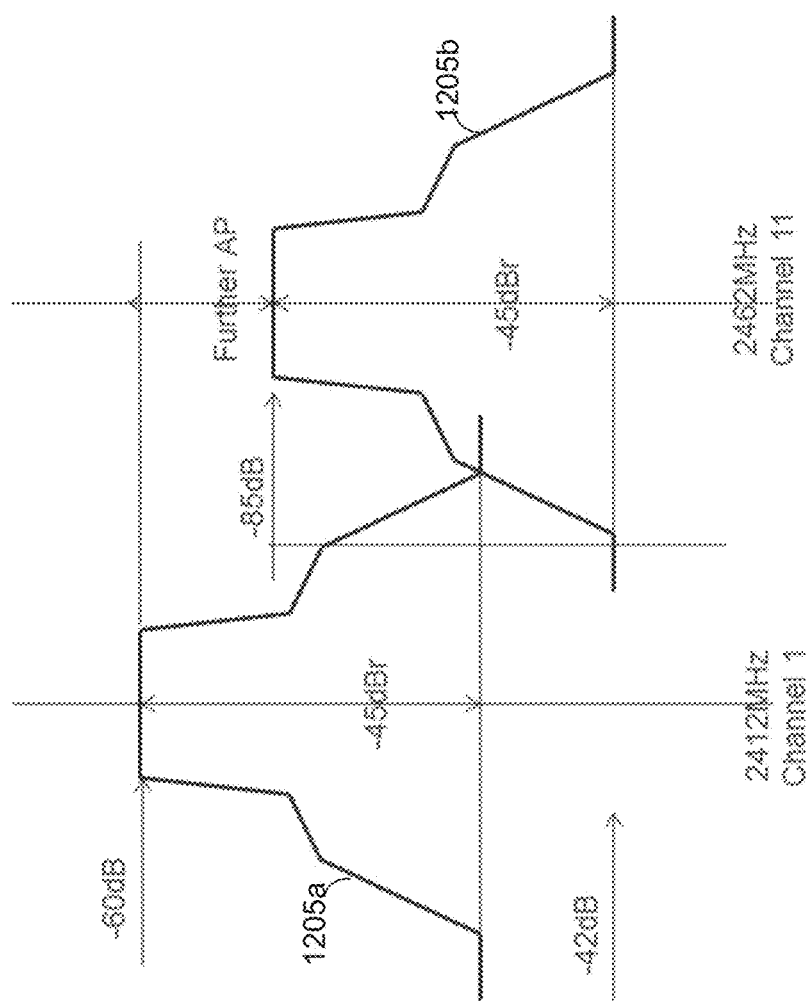
FIG. 12 is plot of the effect of interfering access points in the frequency domain as may occur in some embodiments.

FIG. 12 is a plot of the effect of interfering access point masks 1205*a-b* (e.g., for different channels) in the frequency domain as may be applied in some embodiments. Some embodiments may distance channel filters to minimize interfering overlap. The transmission path may result in differing regions of the masks to have greater or less effect. Accordingly, the mask width may be dynamically adjusted in some embodiments based upon the existing channel conditions.

Figure 13:
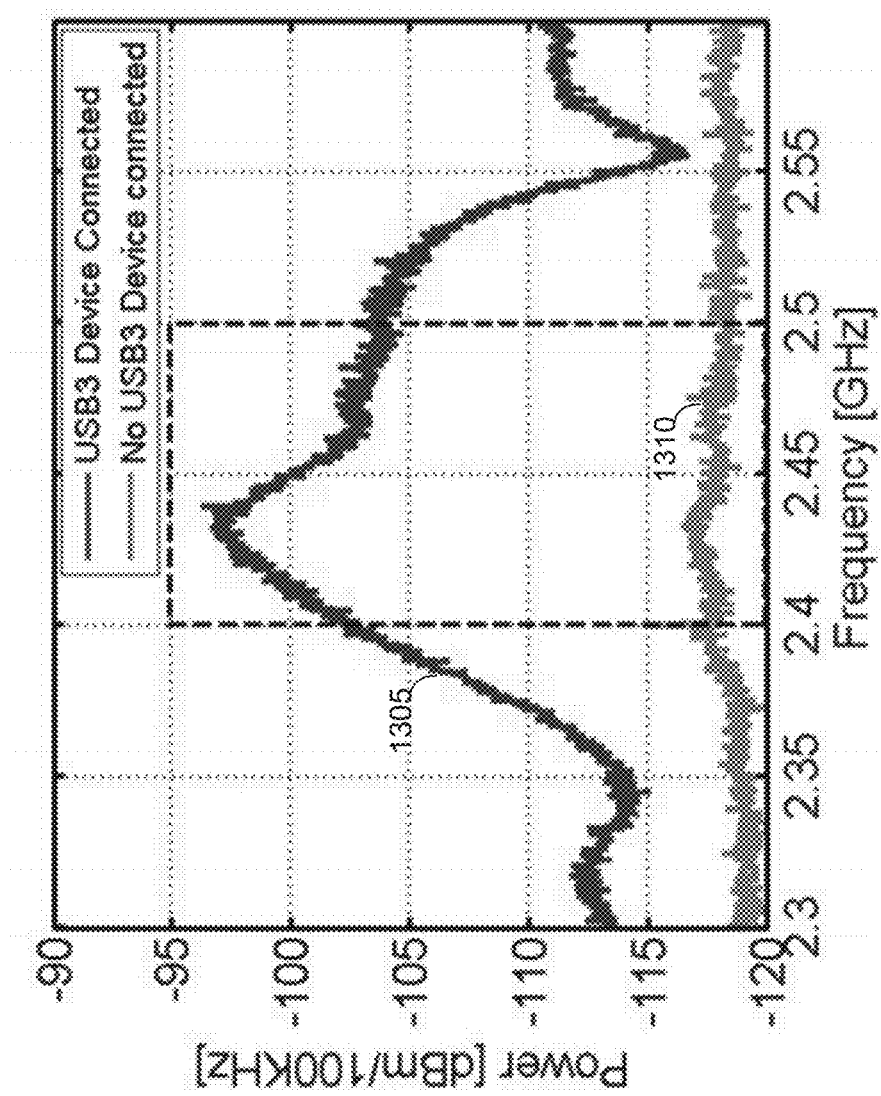
FIG. 13 is plot of the effect of USB 3.0 interference upon the 2.4 GHz band as may occur in some embodiments.

FIG. 13 is plot of the effect of USB 3.0 interference upon the 2.4 GHz band as may occur in some embodiments. As indicated, with a USB device connected 1305 there may be considerable interference in the 2.4-2.5 GHz region, as compared with the device's absence 1310. By operating in a lower Sub1G region such interference can be avoided.

Backhaul Channel Selection

In some embodiments, 2.4G and 5G radios may be used to connect to a home AP or home gateway when the Sub1G band is jammed. An automatic backhaul channel selection algorithm may be used to perform a fallback to 2.4G or 5G band if necessary. Parameters such as noise and interference level in Sub1G, 2.4G, and 5G, the number of other active devices, and available bandwidth in the country of operation may be used in the backhaul channel selection. Various of the traffic management criteria described below may be used to determine when the quality has sufficiently deteriorated so as to return to a 2.4 GHz or 5 GHz channel.

Some embodiments contemplate a repeater channel and band selection algorithm to determine which band (2.4G or 5G) to use to service connected clients. The algorithm may consider one or more of: Interference from WLAN and non WLAN clients; QoS requirement based on client use case; TPUT and range requirement based on the client use-case; etc. The algorithm may take a weighted sum of these various factors and take action based upon the resultant output. The selected band may also depend upon the region in which the transceiver operates. The table of FIG. 3 depicts the frequency range for different channels in various regions. Different channels may accordingly be selected for the backhaul depending upon the relevant region.

Traffic Management

In some situations, the Sub1G spectrum may be generally more limited in bandwidth as compared to the 2.4G, 5G, or 60 GHz bands. Accordingly, it may be useful to determine the type and extent of wireless usage by each application communicating on the Sub1G spectrum. Anticipating the time and extent per application, some embodiments can allocate communication times based upon the defined policies for each application type.

This may be accomplished in some embodiments by a two-step process: 1) detecting the type of traffic; and 2) assigning bandwidth to the detected traffic. Measurement data for traffic classification may be collected in several ways. In some embodiments, the system will actively measure the spectrum by injecting "testing" packets into the network. These "testing" packets may then be processed as they are received at another part of the network (or via round-trip back to the source). The testing packets' experiences traversing the network may then be used to form an appropriate classification. The commonly known NMap application provided by Gordon Lydon is an example of a suitable active fingerprinting tool. Despite its flexibility, active monitoring may impose an undesirable load upon the network with the additional testing packets. Accordingly, passive monitoring may be preferred in many embodiments.

The system may monitor passively by observing existing traffic in the network to identify unique characteristics for particular operating systems, client applications, network services, etc. These passive measurements may be used to infer various network characteristics, including: Internet link loss, congestion sharing, link capacity, network performance discovery, etc. The developed methods can be used to classify the traffic that is going over a Sub1G wireless link.

The system may passively fingerprint not only the operating system associated with network packets, but any unique and relevant traffic. Web and mail servers often generate more information communicating with clients and application signatures may be used to characterize the bandwidth needed to provide consistent service. Information in TCP headers, e.g., TCP SYNC+ACKs, may be used to classify traffic as well as RTTs of TCP connections established with remote hosts. Packet pairs (e.g., two back-to-back packets) may be used to assess the network's effect (e.g., the resulting separation in their response times may indicate characteristics in the network). The median and entropy of the inter-arrival times of the packet pairs, the ACK inter-arrival time, DHCP fingerprinting, MAC Vendor fingerprinting from ARP data, HTTP Request and HTTP response may be used. Identification of the FTP, SMPTU, SSL, and other protocols may also be performed to assist with classification.

One approach that may be used to identify applications on an IP network is to associate the observed traffic with an application based on TCP or UDP port numbers. The TCP/UDP port numbers may be divided into three ranges, e.g.: ports (0-1023), the registered ports (1024-49151), and the dynamic and/or private ports (49152-65535). A TCP connection may begin with a SYN/SYN-ACK/ACK from a client to a server. The client addresses its initial SYN packet to a server port associated with a particular application.

All future packets in either a TCP or UDP session may then use the same pair of ports. Therefore, in principle, the TCP or UDP server port number can be used to identify the higher layer application, by identifying ports and mapping ports to an application using the IANA (Internet Assigned Numbers Authority). The mapping may only be valid until a user changes the ports.

Tools known in the community, such as passive real time asset detection system (PRADS), P0f, and NetworkMiner may be used in some embodiments. Various embodiments define a specification associated with a desired bandwidth, mean bandwidth usage, max usage, minimum bandwidth needed to maintain the service, priority, etc. for each traffic type. The system may take action based upon the specification associated with the traffic following its classification.

Traffic metering may be performed to ensure packet compliance with the intended maximum usage. Traffic shaping methods may impose limits on bandwidth and "burstiness" of traffic based upon the metering results so that the Sub1G wireless link traffic delivery likelihood increases.

Traffic shaping can be performed by imposing delays upon non-conforming traffic which adversely affects bandwidth and burstiness. Prematurely arriving packets may be buffered to provide a more consistent flow. The system may employ various queue management algorithms to the buffer, including: Tail drop; Random Early Discard; and Unshaped forwarding of overflow traffic.

Traffic policing methods implemented at the system may drop or mark non-conforming traffic. The system may optimize or guarantee performance, improve latency, and/or increase or guarantee bandwidth for other packets, by delaying or dropping certain packets, based, e.g., upon their classification. Some embodiments may employ the queuing layer (in the stack between ISO layers 2 and 3) found in some UNIX systems to perform traffic management (traffic shaping and traffic control). The queuing layer may be used as a base for traffic management of the Sub1G link The software or firmware may implement queuing layer controls to determine when an outgoing packet is sent to a network interface, which network is used (e.g., when using link aggregation), which packets to send to the network interface next, which incoming packet is sent to layer 3 code, etc. The traffic management may further be enabled by allowing the creation of additional queues and by changing the functions associated with the service points of each queue ("add to queue" and "remove from queue" operations); these functions may be referred to as "queuing disciplines" or "qdiscs".

Each of the above-described traffic management operations may be used to improve the operation of the Sub1G backhaul as well as to identify optimal times for switching from communication across a 2.5/5 GHz network to the Sub1G backhaul and vice versa.

Computer System

Figure 14:
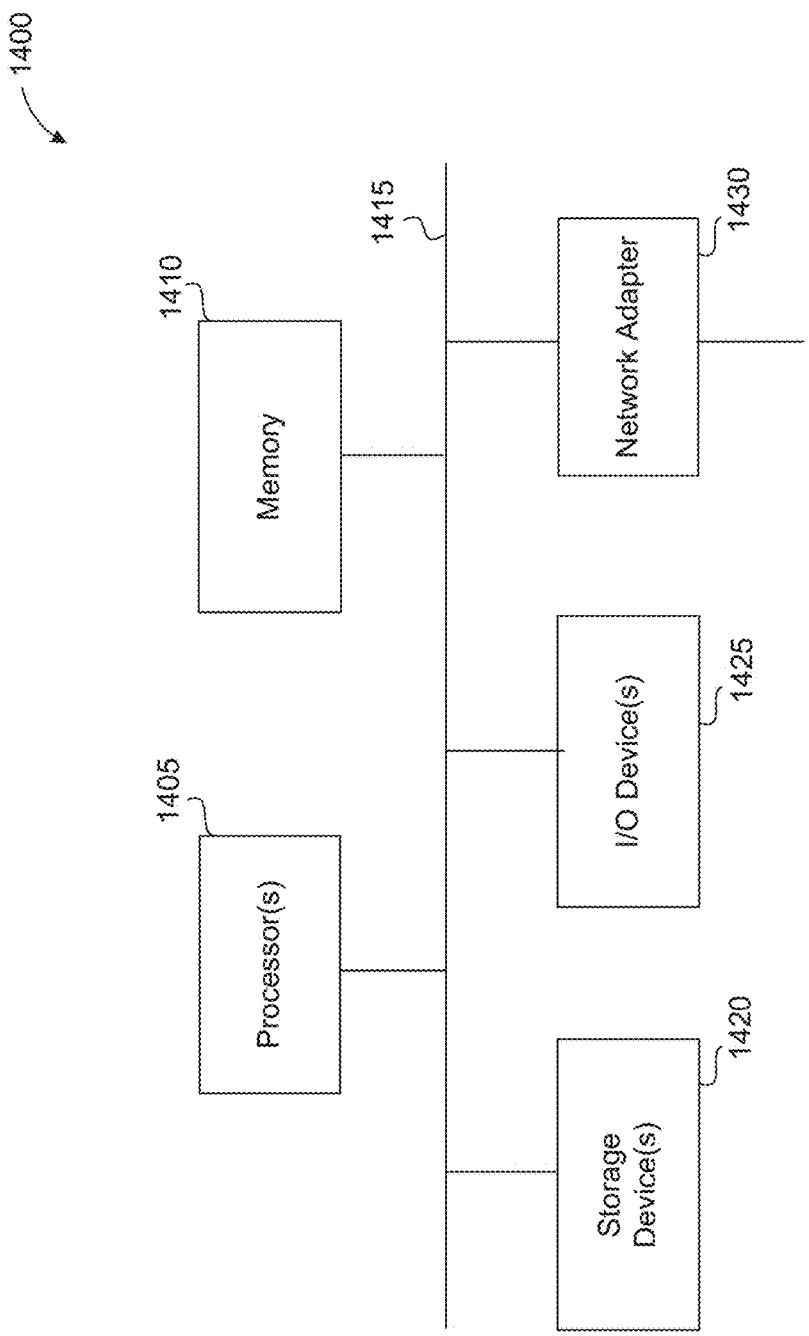
FIG. 14 is a block diagram of a computer system as may be used to implement features of some of the embodiments.

FIG. 14 is a block diagram of a computer system as may be used to implement features of some of the embodiments. The computing system 1400 may include one or more central processing units ("processors") 1405, memory 1410, input/output devices 1425 (e.g., keyboard and pointing devices, display devices), storage devices 1420 (e.g., disk drives), and network adapters 1430 (e.g., network interfaces) that are connected to an interconnect 1415. The interconnect 1415 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1410 and storage devices 1420 are computer-readable storage media that may store instructions that implement at least portions of the various embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 1410 can be implemented as software and/or firmware to program the processor(s) 1405 to carry out actions described above. In some embodiments, such software or firmware may be initially provided to the processing system 1400 by downloading it from a remote system through the computing system 1400 (e.g., via network adapter 1430).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A communications apparatus comprising:
    a WLAN module configured for communication on at least one of the 2.4 GHz or 5 GHz bands;
    a frequency adjusting component in communication with the WLAN module, the frequency adjusting component configured to shift a data signal received from the WLAN module to a sub 1G industrial scientific and medical (ISM) band;
    filtering components configured to receive a signal from the frequency adjusting component and to communicate the filtered signal to an output configured to communicate with at least one antenna, wherein the filtering components include a low pass filter, power amplifiers and a band pass filter, the low pass filter configured to remove frequencies above the sub 1G ISM band, and the band pass filter configured to remove frequencies above the sub 1G ISM band and to remove frequencies below the sub 1G ISM band;
    a sub 1G access point configured for communication on at least the sub 1G ISM band simultaneously with the WLAN module and containing data content corresponding to communication on the WLAN module, having a physical communicative connection with the filtering components and; and
    wherein the WLAN module is configured to inject testing packets into the sub 1G, ISM band, process the test packets, and provide an NMap classification for the band.

2. The communications system of claim 1, wherein the frequency adjusting component is a mixer.

3. The communications system of claim 1, wherein the frequency adjusting component is configured to receive an input from a local oscillator.

4. The communications system of claim 3, wherein the local oscillator is a phase-locked loop.

5. The communications system of claim 1, wherein the communications system is connected as a peripheral to a user device.

6. The communications system of claim 1, wherein the communications system is in communication with a user device via a 2.4 GHz or 5 Ghz channel and wherein the communications system is in communication with an access point across a sub 1G ISM band backhaul.

7. The communications system of claim 1, wherein the communications system is a repeater configured to extend a range of an access point.

8. The communications system of claim 1, wherein the communications system is a USB peripheral.

9. The communications system of claim 1, wherein the communications system is configured to provide a sub 1G ISM connection to a home gateway.

10. A non-transitory computer-readable medium comprising instructions executable by at least one processor to perform a method comprising:
    shifting a data signal received from a WLAN module to a sub 1G industrial scientific and medical (ISM) band via a frequency adjusting component in communication with the WLAN module, the a WLAN module configured for communication on at least one of the 2.4 GHz or 5 GHz bands;

receiving, at a filtering component, a signal from the frequency adjusting component which is filtered to remove frequencies above and below the sub 1G ISM band;
injecting test packets into the sub 1G ISM band;
processing the test packets;
generating an NMap classification of the local area;
communicating the filtered signal to a sub 1G access point; and
transmitting the signal from the WLAN module and transmitting the filtered signal from the sub 1G access point.

11. A computer-implemented method for extending a wireless range comprising:
receiving, at a first device, a communication signal on a band other than a sub 1G industrial scientific and medical (ISM) band;
shifting the communication signal received from the first device to a sub 1G ISM band via a frequency adjusting component in communication with the first device, the first device configured for communication on at least one of the 2.4 GHz or 5 GHz bands;
receiving, at a filtering component, a signal from the frequency adjusting component, and
filtering out frequencies of the communication signal above and below the sub 1G ISM band resulting in a filtered communication signal;
injecting test packets into the sub 1G ISM band;
processing the test packets;
generating an NMap classification of the local area; and
transmitting the filtered communication signal across a sub 1G ISM backhaul from the first device to a second device and transmitting the communication signal across at least one of the 2.4 GHz or 5 GHz band simultaneously.

12. The computer-implemented method of claim 11, wherein the first non-sub 1G ISM band is at least one of a 2.4 GHz or 5 GHz band.

13. The computer-implemented method of claim 11, wherein the first device is a Sub1G access point in communication with a gateway device.

14. The computer-implemented method of claim 11, wherein the second device is a Sub1G access point peripheral in communication with a computer system.

15. The computer-implemented method of claim 11, wherein the second device is a repeater, the repeater configured to generate a 2.4 GHz or 5 GHz band from the communication received on the sub 1G backhaul.

16. The computer-implemented method of claim 11, wherein the frequency adjusting component is a mixer.

* * * * *